US008666190B1

(12) United States Patent
Marwood et al.

(10) Patent No.: US 8,666,190 B1
(45) Date of Patent: Mar. 4, 2014

(54) LOCAL BLACK POINTS IN AERIAL IMAGERY

(75) Inventors: David Marwood, San Francisco, CA (US); Hong Guo, Palo Alto, CA (US); Aaron Yonas, Berkeley, CA (US)

(73) Assignee: Google Inc., Mountain View, CA (US)

( * ) Notice: Subject to any disclaimer, the term of this patent is extended or adjusted under 35 U.S.C. 154(b) by 453 days.

(21) Appl. No.: 13/018,986

(22) Filed: Feb. 1, 2011

(51) Int. Cl.
G06K 9/00 (2006.01)

(52) U.S. Cl.
USPC ........... 382/274; 382/164; 382/167; 382/254; 382/257

(58) Field of Classification Search
USPC .......................... 382/164, 167, 254, 257, 274
See application file for complete search history.

(56) References Cited

U.S. PATENT DOCUMENTS

| | | | |
|---|---|---|---|
| 5,726,656 A | 3/1998 | Frankot | |
| 6,037,976 A | 3/2000 | Wixson | |
| 6,484,099 B1 | 11/2002 | Holzer-Popp et al. | |
| 6,760,108 B2 | 7/2004 | Ohga | |
| 7,187,808 B2 * | 3/2007 | Cho et al. | 382/274 |
| 7,277,200 B2 | 10/2007 | Ohga | |
| 7,447,374 B1 * | 11/2008 | Reid | 382/254 |
| 7,660,517 B2 | 2/2010 | Garg et al. | |
| 2007/0047803 A1 | 3/2007 | Nikkanen | |
| 2007/0285692 A1 | 12/2007 | Nashizawa et al. | |
| 2012/0170842 A1 * | 7/2012 | Liu et al. | 382/167 |

OTHER PUBLICATIONS

Chavez, Pat S., Jr., Abstract of "An Improved dark-object subtraction technique for atmospheric scattering correction of multispectral data," Remote Sensing of Environment, vol. 24, Issue 3, Apr. 1988, pp. 459-479, 1 page.

Chavez, Pat S., Jr., "Image-Based Atmospheric Corrections—Revisited and Improved," Photogrammetric Engineering and Remote Sensing, vol. 62, No. 9, Sep. 1996, pp. 1025-1036.

Du et al., Abstract of "Haze detection and removal in high resolution satellite image with wavelet analysis," IEEE Transactions on Geoscience and Remote Sensing, vol. 40, Issue 1, Jan. 2002, pp. 210-217, 2 pages.

Fattal, Raanan, "Single Image Dehazing," ACM Transactions on Graphics (TOG)—Proceedings of ACM SIGGRAPH 2008, vol. 27, Issue 3, Aug. 2008, New York, NY, 9 pages.

Guindon, B. and Zhang, Y., "Robust Haze Reduction: An Integral Processing Component in Satellite-Based Land Cover Mapping," Symposium on Geospatial Theory, Processing and Applications, Ottawa 2002, 5 pages.

Hadjimitsis et al., Abstract of "An assessment of the effectiveness of atmospheric correction algorithms through the remote sensing of some reservoirs," International Journal of Remote Sensing, vol. 25, Issue 18, 2004, pp. 3651-3674, 1 page.

(Continued)

*Primary Examiner* — Wesley Tucker
(74) *Attorney, Agent, or Firm* — Dority & Manning, P.A.

(57) ABSTRACT

The system and method of use are provided for correcting digital images based on the notions of local black points. The system and method are based on determining local black points in a digital image and correcting the intensities of nearby pixels so as to remove bias in the image introduced by atmospheric conditions. By sampling only localized land imagery the claimed method computes black points that are more robust against the localized effects of atmospheric and land reflection effects than black points computed from wider areas. The result of the method is that images corrected by this method are robust to atmospheric conditions that vary with time and viewing angle.

21 Claims, 7 Drawing Sheets

(56) References Cited

OTHER PUBLICATIONS

Levin et al., "A Closed Form Solution to Natural Image Matting," IEEE Computer Society Conference on Computer Vision and Pattern Recognition, Jun. 17-22, 2006, pp. 61-68.

Lu, Jian and Healy, D.M., Jr., "Contrast Enhancement via Multiscale Gradient Transformation," IEEE International Conference on Image Processing, Nov. 13-16, 1994, pp. 482-486.

Moro, G.D. and Halounova, L., Abstract of "Haze removal for high-resolution satellite data: a case study, " International Journal of Remote Sensing, vol. 28, Issue 10, 2007, pp. 2187-2205.

Narasimhan, Srinivasa G. and Nayar, Shree K., "Chromatic Framework for Vision in Bad Weather," IEEE Conference on Computer Vision and Pattern Recognition, vol. 1, Jun. 2000, pp. 598-605.

Narasimhan, Srinivasa G. and Nayar, Shree K., "Contrast Restoration of Weather Degraded Images," IEEE Transactions on Pattern Analysis and Machine Intelligence, vol. 25, No. 6, Jun. 2003, pp. 713-724.

Narasimhan, Srinivasa G. and Nayar, Shree K., "Interactive (De)Weathering of an Image using Physical Models," ICCV Workshop on Color and Photometric Methods in Computer Vision, Oct. 2003, 8 pages.

Narasimhan, Srinivasa G. and Nayar, Shree K., "Removing Weather Effects from Monochrome Images," IEEE Conference on Computer Vision and Pattern Recognition, vol. 2, Dec. 2001, pp. 186-193.

Narasimhan, Srinivasa G. and Nayar, Shree K., "Vision and the Atmosphere," International Journal of Computer Vision, vol. 48, No. 3, Jul. 2002, pp. 233-254.

Narasimhan, Srinivasa G. and Nayar, Shree K., "Vision in Bad Weather," IEEE International Conference on Computer Vision, vol. 2, 1999, pp. 820-827.

Oakley, J.P., Abstract of "Correction of Simple Contrast Loss in Color Images," IEEE Transactions on Image Processing, vol. 16, Issue 2, Feb. 2007, pp. 511-522, 1 page.

Rahman et al., "Multi-Scale Retinex for Color Image Enhancement," International Conference on Image Processing, vol. 3, Sep. 16-19, 1996, Lausanne, Switzerland, pp. 1003-1006.

Richter, Rudolf, Abstract of "A Spatially adaptive fast atmospheric correction algorithm," International Journal of Remote Sensing, International Journal of Remote Sensing, vol. 17, Issue 6, Apr. 1996, pp. 1201-1214, 2 pages.

Richter, Rudolf, Abstract of "Atmospheric correction of satellite data with haze removal including a haze/clear transition region," Computers & Geosciences, vol. 22, Issue 6, Jul. 1996, pp. 675-681, 1 page.

Schechner et al., "Instant Dehazing of Images Using Polarization," Proceedings of the 2001 IEEE Computer Society Conference on Computer Vision and Pattern Recognition, Jun. 2001, pp. 325-332.

Schechner et al., "Polarization-based vision through haze," Applied Optics, vol. 42, No. 3, Jan. 20, 2003, pp. 511-525.

Shen, Fang and Verhoef, Wouter, "Suppression of local have variations in MERIS images over turbid coastal waters for retrieval of suspended sediment concentration," Optics Express, vol. 18, No. 12, Jun. 7, 2010, pp. 12653-12662.

Shwartz et al., "Blind Haze Separation," Proceedings of the 2006 IEEE Computer Society Conference on Computer Vision and Pattern Recognition, vol. 2, Jun. 17-22, 2006, pp. 1984-1991.

Tan, KokKeong and Oakley, John P., "Enhancement of Color Images in Poor Visibility Conditions," Proceedings of International Conference on Image Processing, vol. 2, Sep. 10-13, 2000, pp. 788-791.

Tan, Robby T., "Visibility in Bad Weather from a Single Image," Proceedings of IEEE Conference on Computer Vision and Pattern Recognition, Jun. 23-28, 2008, pp. 1-8.

Zhang et al., Abstract of "An image transform to characterize and compensate for spatial variations in thin cloud contamination of Landsat images," Remote Sensing of Environment, vol. 82, Issues 2-3, Oct. 2002, pp. 173-187, 4 pages.

Zhang, Ying and Guindon, B., Abstract of "Quantitative assessment of a haze suppression methodology for satellite imagery: effect on land cover classification performance," IEEE Transactions on Geoscience and Remote Sensing, vol. 41, Issue 5, May 2003, pp. 1082-1089, 1 page.

"Unsharp masking," From Wikipedia, the free encyclopedia, http://en.wikipedia.org/wiki/Unsharp_masking, last modified on Feb. 18, 2012, 4 pages.

* cited by examiner

LOCAL BLACK POINTS IN AERIAL IMAGERY

BACKGROUND

1. Field

This disclosure relates to the field of correcting aerial or other natural imagery.

2. Background Art

Aerial imagery of the Earth can have an increased brightness and modified hue compared to a more natural looking image due to scattered light from the atmosphere. Weather conditions often give rise to a bias that needs to be corrected for in the final image. Even for images of the same land area, the bias can vary with time and viewing angle. It can vary even within a single image if different points in the image have sufficiently distinct viewing angles. Similar problems may also occur for other natural imagery, such as, but not limited to, photography of mountains or other natural settings.

A number of computational algorithms have been developed over the years to correct aerial images for atmospheric conditions. Models of light reflectance from the atmosphere and the ground have been developed. These approaches generally require input characterizing the physical environment giving rise to the light scattering. Example inputs include land materials, sun location and direction, or density of the atmosphere.

Other methods may not require input data characterizing the physical environment. One example method of correcting an image that does not require physical characterization of the environment is based on determining a "black point" for the image. A black point may be a point in an image that would be black in a natural image (e.g. a shadow) but in the actual image is not black due to light scattered from the atmosphere. In this method, an intensity value of the black point is determined and subtracted from the intensity of every other point in the image. By subtracting the intensity value, the black point may become truly black. In another example method, rather than subtracting the intensity value of the black point, the image can be corrected by stretching the range of possible intensity values as follows. An image with the possible pixel intensity range [0, 255] for example, the intensity value of each pixel may be stretched from the range between [black_point, 255] to [0, 255].

BRIEF SUMMARY

A computer-implemented method for correcting aberrations in a digital image is provided comprising defining, for each of a plurality of pixels in a digital image, a respective local black point for the pixel, wherein the local black point corresponds to the darkest pixels in a local region consisting of a subset of the pixels in the digital image local to the pixel, and correcting a brightness of each of the pixels in the image based on the respective local black points.

Also provided is a computer implemented system, wherein circuitry is provided for correcting aberrations in a digital image comprising (1) a local black point generation module configured to define, for a plurality of pixels in a digital image, a respective local black point for each of the plurality of pixels, wherein the local black point corresponds to the darkest pixels in a region consisting of a subset of the pixels in the digital image, local to the pixel, and, (2) an image correction module configured to correct a brightness of each of the plurality of pixels in the image based on the local black points.

Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The patent or application file contains at least one drawing executed in color. Copies of this patent or patent application publication with color drawings will be provided by the U.S. Patent and Trademark Office upon request and payment of the necessary fee.

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1:
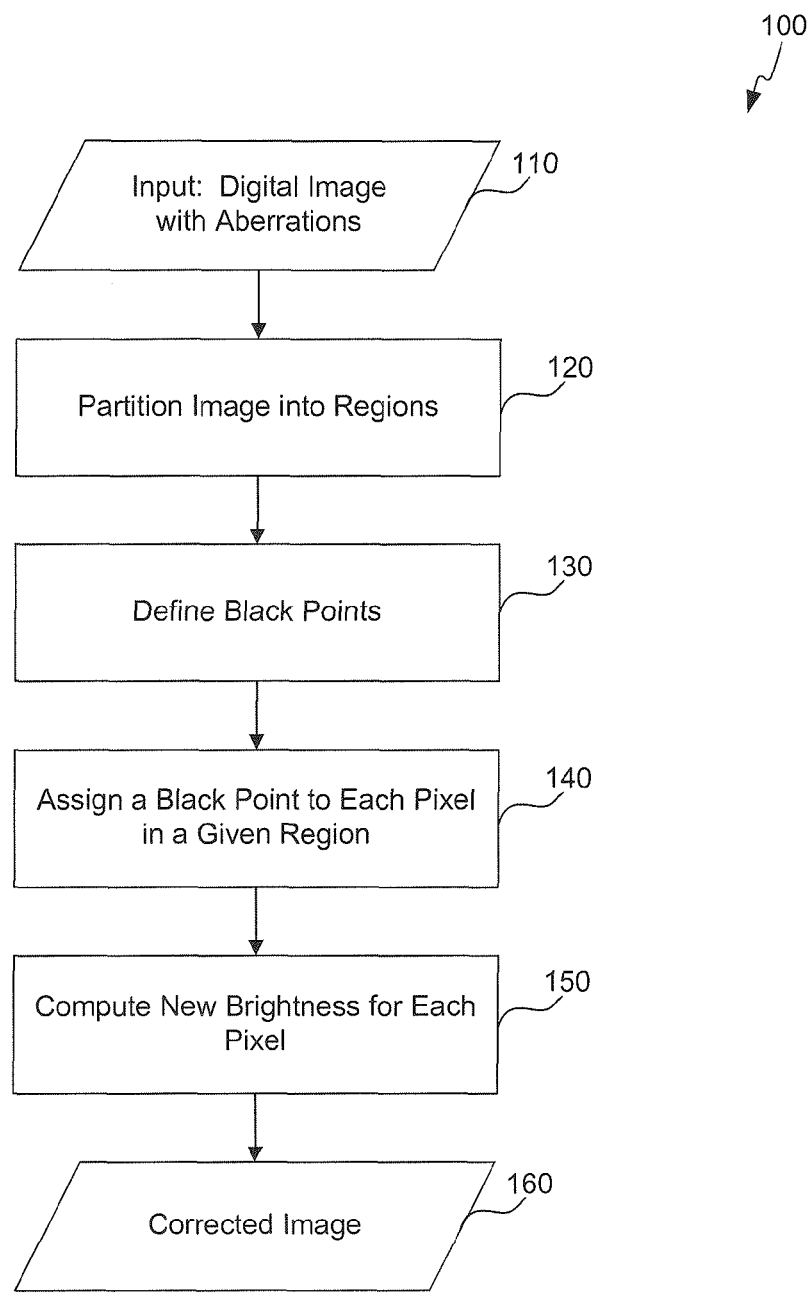
FIG. 1 is a flowchart illustrating a method of correcting a digital image using local black points.

Embodiments are directed to a system and method for correcting aerial and other natural images using local black points. It is noted that reference in this specification to "one embodiment", "an embodiment", "an example embodiment", etc., indicate that the embodiment described may include a particular feature, structure, or characteristic, but not every embodiment may necessarily include the particular feature, structure, or characteristic. Moreover, such phrases are not necessarily referring to the same embodiment. Further when a particular feature, structure, or characteristic is described in connection with an embodiment, it is submitted that it is within knowledge of one skilled in the art to affect such feature, structure, or characteristic in connection with other embodiments whether or not explicitly described. Embodiments will be described with reference to the accompanying figures.

As described above, black points may be used to correct imagery. A black point in an image may be a point that is relatively dark. A "black point" of an image may have a particular brightness level. In an example, the brightness level may be darker than (or have the same brightness of) 99.9% of the pixels in the image and lighter than the remaining 0.1% of pixels. In another example, the brightness level may be darker than (or have the same brightness of) 99.95% of the pixels in the image and lighter than the remaining 0.05% of pixels.

In an example embodiment, a black point may be determined for a region of the image that may be square. In other examples, the region is not necessarily square. It may be a circle or arbitrarily shaped. The black points of an image or region may be the darkest pixel or group of pixels of an image or region ignoring extreme outliers. In an example, where the black point is much brighter than zero intensity, an image sometimes appears "hazy" or "muddy", because in that example, no pixel in an image is truly black.

To reduce the haziness or muddiness, embodiments adjust pixels in each region of an image based on a brightness of the black point of the region. In adjusting the region, the black point itself may be adjusted to zero intensity or zero brightness to be truly black. The brightness of each of the remaining points in the region may be adjusted according to the brightness of the black point and its relative brightness. For an image with the pixel intensity range [0, 255] for example, the brightness value of each pixel may be stretched from the range between [black_point, 255] to [0, 255]. Sometimes images are represented with black having a value larger than 0 or white less than 255 even if the storage allows for the value 255.

By stretching the pixel intensity range, any point that initially appears white will remain white after the correction. Although the term "black points" is used, the points may not actually be black. Aerial photos often look somewhat blue due to light scattered from the air. The amount of blue depends on the viewing angle and there is typically more blue at the edges of the picture than in the middle of the picture. The variations in viewing angle may also introduce a green or red bias that varies across the image. In general, all colors are reflected by the atmosphere and the terrain to differing degrees. Using a single black point for the entire image may not account for variations in bias across the image. As an advantage of using local black points, embodiments are provided that may account for variations in bias across the entire image.

As an example, each pixel in an image is characterized by three colors: red, green and blue. Each pixel corresponds an intensity value between 0.0 and 1.0 for each color. Typically, the darkest pixels in an image, e.g. the local black points, actually have quite a fairly large intensity value for blue, typically on the order of 0.3 out of 1.0.

In principle, for each pixel one might search a local neighborhood to find the nearest black point. In practice, computing local black points for every pixel may be demanding on computing resources, such as processor and memory. To reduce computing requirement some embodiments utilize an approximation of a pixel's local neighborhood. To approximate a pixel's local neighborhood, the image may be divided into overlapping regions. A common local black point (i.e. the nearest black point) to all the pixels within a given region may be assigned. For each pixel, the pixel's assigned local black point may be used to adjust the pixel's intensity. Preferred embodiments will now be described by reference to the accompanying figures.

FIG. 1 illustrates a method 100 for correcting an image based on local black points. Method 100 begins when a digital image 110 is taken as input. Digital image 110 may be a photographic image, such as a photographic image of the ground. Digital image 110 image may be an aerial or satellite image. In some embodiments, digital image 110 may be any natural image. The image may include certain aberrations. The aberrations may, for example, be due to light scattering from the atmosphere. Further, the aberrations may be non-uniform across the image. In the example where the aberrations are due to light scattering from the atmosphere, the aberrations may vary due to variations in viewing angle. As the viewing angle is closer to parallel with the ground, light may have to travel through more air. As light travels through more air, the aberrations may become more pronounced. As would be apparent to a person of ordinary skill in the art, digital image 110 may include a plurality of pixels.

Once digital image 110 is received, the input image 110 may be partitioned into regions at step 120. The regions may be circular, rectangular, square, etc. The regions may be overlapping. However, partitioning the image into regions may enable black points local to each pixel to be determined more efficiently. In this way, step 120 may reduce computing requirements. Further examples of partitioning an image into regions are described below with respect to FIGS. 2 and 3.

In a further embodiment, a region specific to each pixel in the image may be determined at step 120. In that embodiment, each pixel may have a corresponding region. For example, the region may be all the pixels within a predefined radius. While that embodiment may determine local black points more accurately, it may also may require more computing resources.

Once digital image 110 is received and regions are determined, black points are determined for the image at step 130. Specifically, in an embodiment, a black point may be determined for each region determined at step 120. Each local black point may be a point in a region that is relatively dark relative to other points in the region. The brightness level of a local black point may be darker than (or have the same brightness of) 99.9% of the pixels in the region and lighter than the remaining 0.1% of pixels. The black points of a region may be the darkest pixel or group of pixels of an image or region ignoring extreme outliers. In the next step 140, the nearest local black point is assigned to each pixel in a region. The nearest local black point to a given region may come from within the region or it may come from a nearby region. In this way, regions are used to correlate each pixel with a black point. Because a region includes the area local to its corresponding pixel, the black point assigned at step 140 is also local to its corresponding pixel.

Based on the local black point, a new brightness for each pixel in the region 150 is computed, resulting in a final corrected image 160. In an example, the intensity range [black_point,1.0] of the uncorrected image may be altered (i.e. "stretched") to the new range [0.0,1.0].

In an embodiment, a pixel's color may be defined by a numeric value. That numeric value may, for example, include red, green, and blue components. In 8-bit color, the leftmost three bits may represent the red components, the middle three bits may represent the green component, and the rightmost two bits may represent the blue component. Each component may have an intensity indicating the degree to which the pixel's color resembles the component's color. In that example, for each pixel, the intensity of each of the components may be adjusted according to the intensity of the corresponding component of that pixel's local black point. For example, a pixel's local black point may have a strong blue component, but non-existent red and green component. In that example, the pixel's blue component may be stretched, but the red and green components may remain unchanged. While this example is provided for 8-bit color for illustrative purposes, a person of skill in the art would recognize that similar techniques may be utilized for other pixel representations, such as 24-bit or 32-bit truecolor.

In an embodiment, a pixel's component may be stretched linearly. To stretch linearly, the corresponding black point may be used to determine a ratio, and the pixel's component may be scaled by that ratio.

In this way, by adjusting the color of each pixel based on a black point that is local to that pixel, embodiments help to remove color aberrations that are not uniform across the image.

Figure 2:
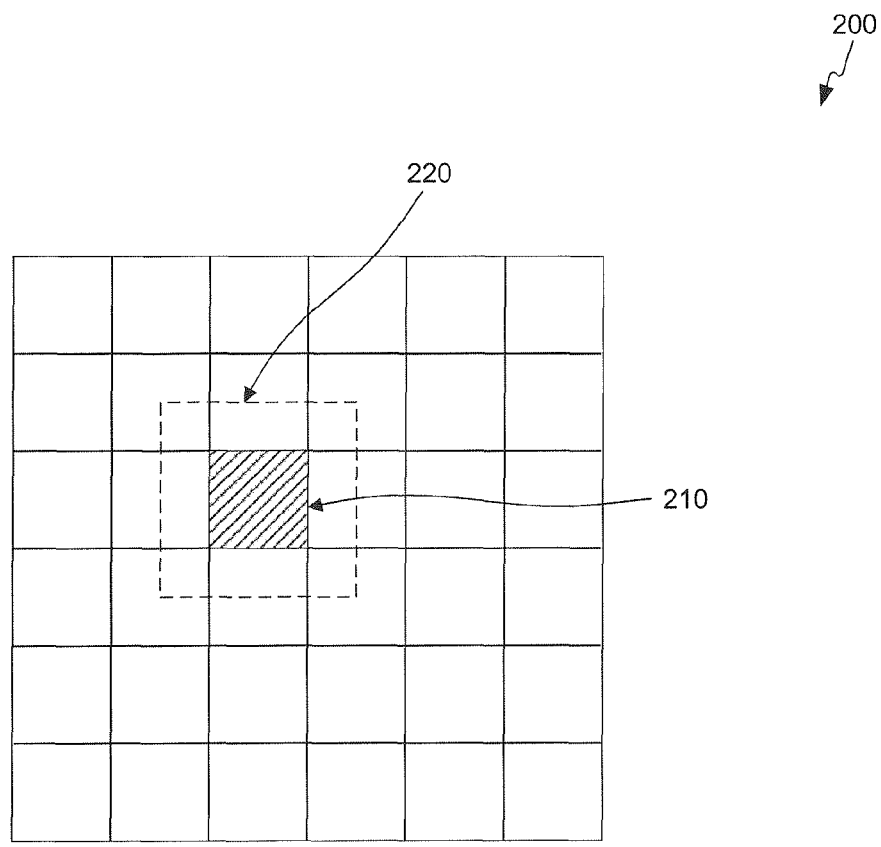
FIG. 2 is a diagram illustrating how an image is divided into overlapping regions according to an embodiment.

FIG. 2 shows a diagram 200 in which an image is segmented into a rectangular grid. In this example, the segmentation results in a square grid comprising regions 210. In another example, segmentation may result in rectangular regions. In yet another example, segmentation may result in circular regions. Also illustrated is a larger overlapping region 220 that surrounds the smaller region 210. In another example, the overlapping region may be larger to encompass more local regions. In an embodiment of an image correction method, one corrects the intensity values of the pixels in a small region 210 based on the nearest local black point to the local region 210 whether that black point lies in the region 210 or within the larger overlapping region labeled by 220.

Other techniques for image segmentation known in the art may be employed to segment the image. In an example embodiment, clustering methods such as the K-means algorithm may be used to segment the image. In this approach, a plurality of pixels in the image are each assigned to their respective clusters so as to minimize the distance from a given pixel to the center of the cluster.

In another example embodiment, a Histogram-based method may be used to categorize a plurality of pixels in the image or local region based on some quality value such as intensity. Maxima and minima of intensity found in this way may be used to define image segments.

In another example embodiment, edge detection techniques may be used to segment the image. In this approach, an image may be divided into regions/segments defined by boundaries where intensity changes rapidly with distance.

Figure 3:
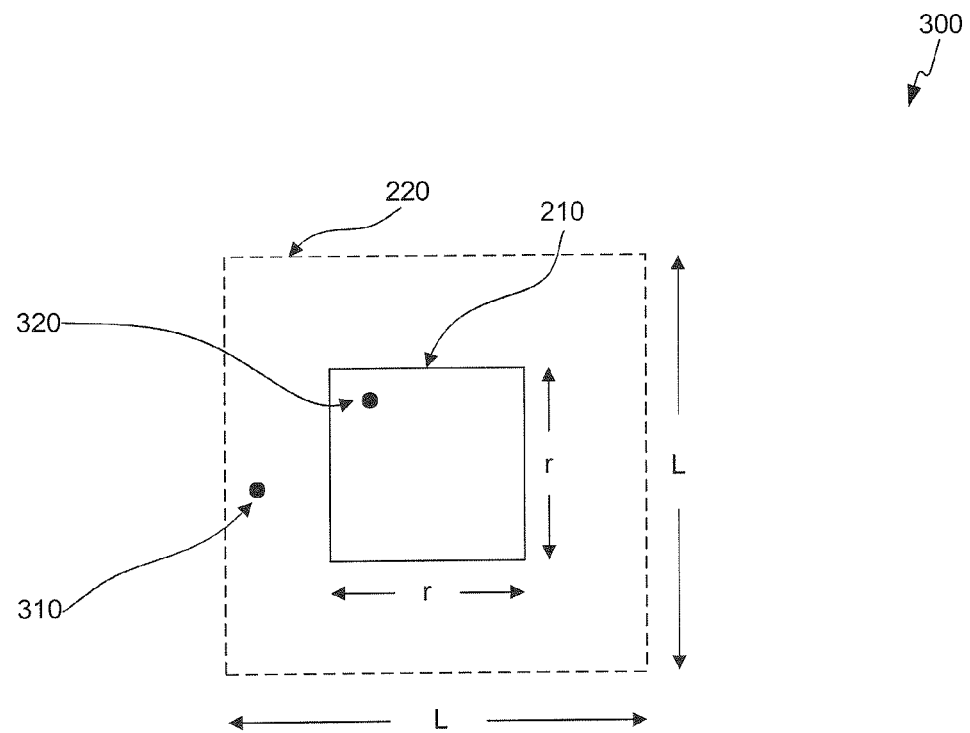
FIG. 3 is a diagram illustrating how local black points are defined in a local region and surrounding overlapping regions.

FIG. 3 provides a blowup illustration 300 of a small region 210 and its surrounding overlapping region 220 first introduced in FIG. 2. One aim of embodiments is to correct the intensity values of pixels in the smaller region 210. To that end, a search may be carried out of all the pixels in each small region 210 as well as in the surrounding overlapping region 220 for black points. More specifically, the intensity values of all the pixels in regions 210 and 220 may be compared to determine the ones with the smallest values of intensity so as to identify black points. The black point(s) so identified may lie within the smaller region 210 as illustrated by feature 320 or may lie in the larger surrounding region 220 as illustrated by feature 310 or both. The nearest local black point to a given smaller region 210 is used to correct all the pixels in that region 210. In this illustration, the smaller region is a square comprising $r^2$ pixels, where r is the number of pixels spanning the length of an edge of region 210 and the larger region 220 contains $L^2$ pixels (including the $r^2$ pixels of the enclosed smaller region 210), where L is the number of pixels spanning the length of an edge of region 220. In one embodiment, the values r=500, and L=1000 may be chosen.

In another example embodiment, more than one black point may be used to correct the pixels in a small region 210. In such an embodiment more than one black point may be assigned to a given small region 210. A given pixel in a given small region 210 my be assigned to the nearest black point. In another embodiment, multiple local black points may be used to correct the intensity of a given pixel based on a correction rule. In an example embodiment, a correction rule may take the weighted average of several local black points to correct the intensity of a given pixel.

In other example embodiments a construction similar to that of FIG. 3 comprising small regions with overlapping larger regions may be constructed. In particular, the smaller region and surrounding overlapping regions may be of arbitrary shape. Example shapes include but are not limited to rectangles, circles, triangles, polygons, etc.

Figure 4:
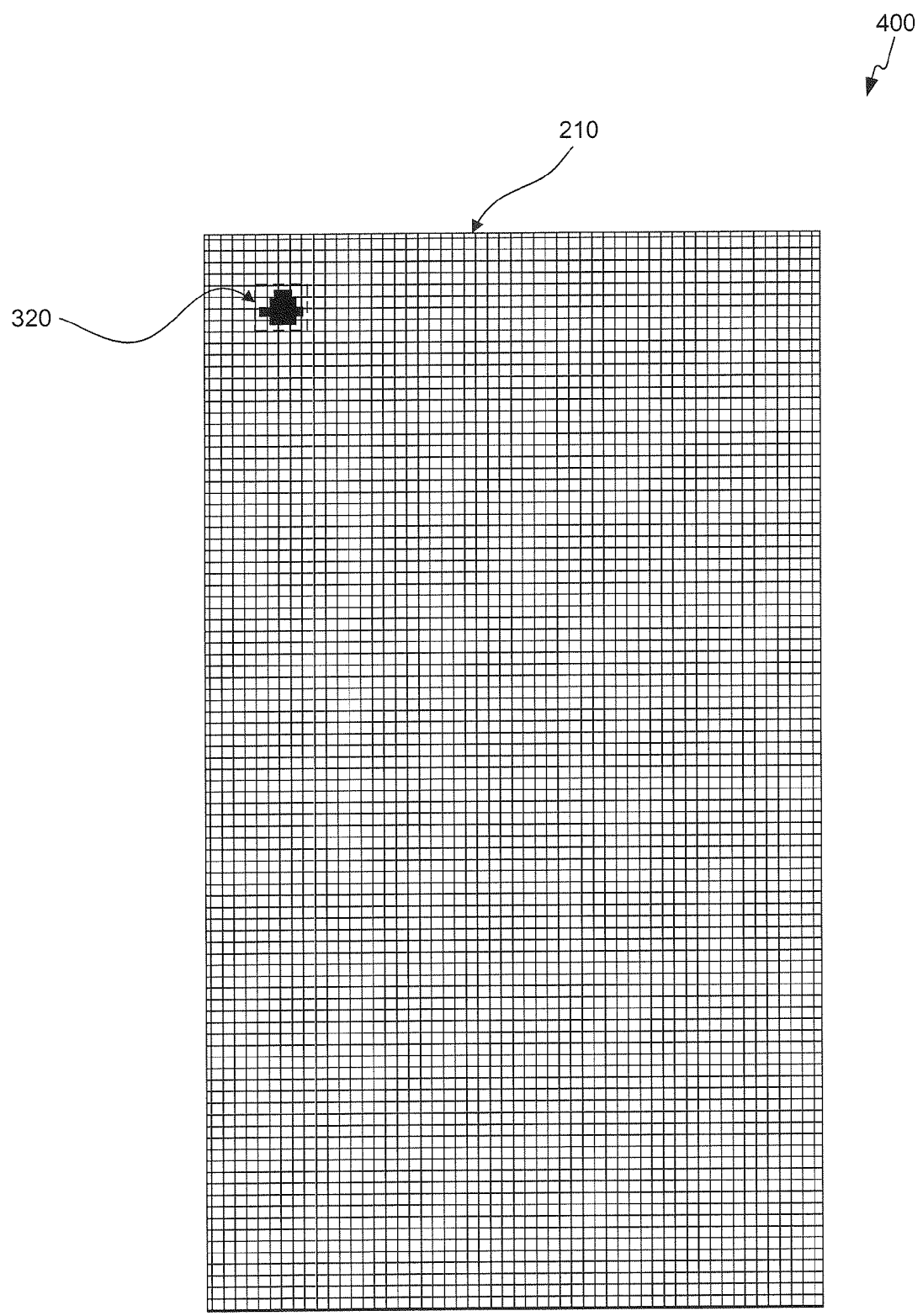
FIG. 4 is a diagram according to an embodiment, showing a local black point that may contain one or more pixels that are the darkest pixels in a given region.

FIG. 4 shows a diagram 400 illustrating the notion of a black point in more detail. The black point 320 in this figure is illustrated as a cluster of dark pixels. Thus a black point corresponds to an intensity value and can represent either a single pixel or a cluster of pixels. Note also that the region has been illustrated as rectangular which is more general than what was illustrated in the FIG. 3, but is nonetheless within the scope of the claimed invention. The intensity that characterizes the black point may be the total intensity comprising a sum over individual intensities for the various color components. In other embodiments, the intensity that characterizes a black point may correspond to a particular color. In other embodiments, the intensity that characterizes a black point may be an arbitrary weighted average of intensity values corresponding to two or more colors.

Figure 5:
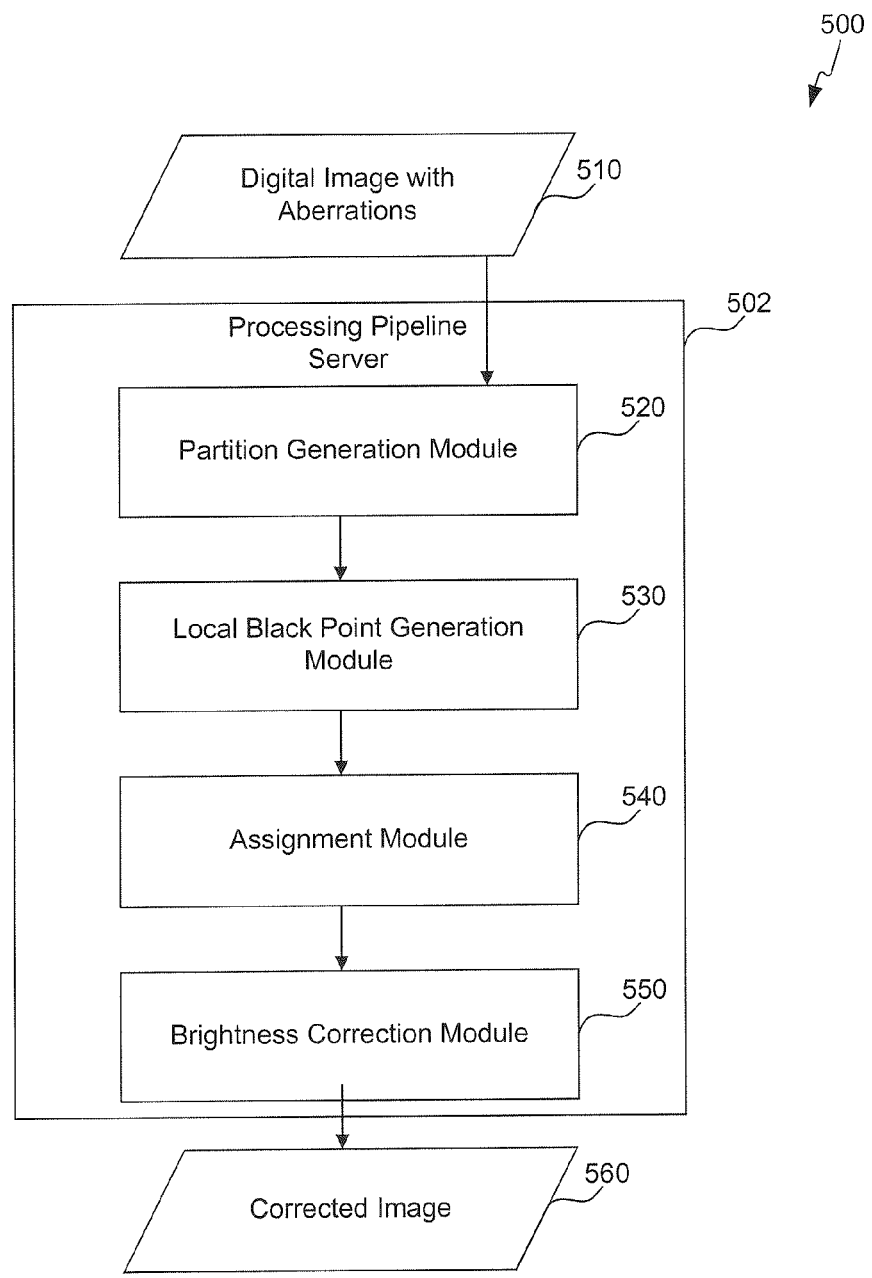
FIG. 5 is a schematic illustration of an embodiment of a system used for correcting digital images based on local black points.

FIG. 5 illustrates the computational system 500 that is used to correct digital images for aberrations based on the method described. System 500 includes a Processing Pipeline Server 502. Processing Pipeline Server 502 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

The input to the system is a digital image with aberrations 510. The digital image may be represented by pixels which are input to the partition generation module 520. The partition generation module partitions the image into small regions, each one surrounded by an overlapping region as discussed with reference to FIGS. 2 and 3. The output of the partition generator 520 is fed to the input of the local black point generation module 530. This module identifies the local black points by comparing the intensity values of all the pixels in a region as well as the pixels in the surrounding region to identify the pixel or local group of pixels that have the least intensity. The intensity that characterizes the black point may be the total intensity comprising a sum over individual intensities for the various color components. In other embodiments, the intensity that characterizes a black point may correspond to a particular color. In other embodiments, the intensity that characterizes a black point may be an arbitrary weighted average of intensity values corresponding to two or more colors.

The collection of black points is fed to the assignment module 540. The assignment module considers all the pixels in a small region and to each one of those pixels it assigns the nearest local black point, which could be a black point in the small region or in an overlapping surrounding region (illustrated by features 320 and 310 respectively in FIG. 3). In other embodiments, multiple local black points may be used to correct the intensity of a given pixel based on a correction rule. In an example embodiment, a correction rule may take the weighted average of several local black points to correct the intensity of a given pixel.

The output of the assignment module 540 is fed in to the brightness correction module 550. This module alters the brightness of all the pixels in a region by stretching the possible values of intensity from the lower bound (which is the intensity of the black point) to the maximum. It stretches this possible range so that the black point is truly black and has zero intensity. In an example, the intensity range [black_point,1.0] of the uncorrected image is altered (i.e. "stretched") to the new range [0.0,1.0]. In an another example, the intensity range [intensity_black_point,1.0] of the uncorrected image is altered (i.e. "stretched") to the new range [0.0,1.0], wherein intensity_black_point is the intensity value of a particular color. In other embodiments, the intensities of several colors are altered individually. The output from module 550 is the corrected image 560.

Each of the modules of Processing Pipeline Server 502 may be implemented in hardware, software, or firmware or any combination thereof.

Figure 6:
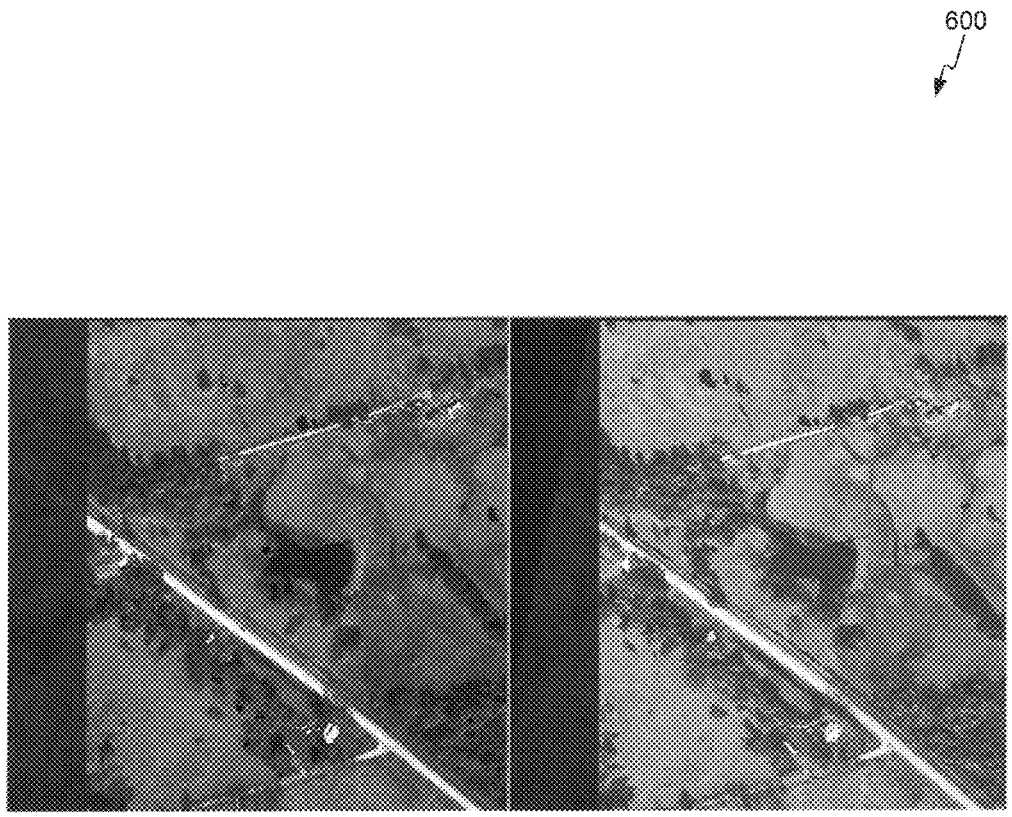
FIG. 6 is a side-by-side comparison of a digital image before (right panel) and after (left panel) correction using an embodiment of the claimed local black point method.
Figure 7:
FIG. 7 is another example of an aerial image before (right panel) and after (right panel) correction using an embodiment of the claimed method.

FIG. 6 shows a diagram 600 illustrating a digital image before (right panel) and after (left panel) correction by a method according to an embodiment. The uncorrected digital image on the right has a considerable blue component whereas this bias has been removed in the corrected image on the left. The amount of blue bias is not constant across the image and is greater at the edges of the image than in the center. This bias is due to weather conditions and is a result of light scattering from the air. This image comprises many dark regions that give rise to black points FIG. 7 shows a diagram 700 illustrating the same geographical scene as was illustrated in FIG. 6 taken under different weather conditions, exhibiting in this case, a considerable red component. The image on the left is the corrected image obtained by a method according to an embodiment. The amount of red bias is not constant across the image and is greater at the edges of the image than in the center. This bias is due to weather conditions and is a result of light scattering from the air. Comparison of the corrected images in FIGS. 6 and 7 (left panels respectively), demonstrates that the claimed method is quite robust in the sense that both images look very similar after correction although the uncorrected images in FIGS. 6 and 7 (right panels respectively) look quite different because of the different weather conditions.

FIGS. 6 and 7 also illustrate the principle that, in general, the intensity correction based on black points depends on color and that different color components will generally be corrected by different amounts. Schematically, the correction in FIG. 6 is of the form in which the intensity range [black_point_blue,1.0] of the uncorrected image is altered (i.e. "stretched") to the new range [0.0,1.0]. Likewise, the correction in FIG. 7 is of the form in which the intensity range [black_point_red,1.0] of the uncorrected image is altered (i.e. "stretched") to the new range [0.0,1.0]. In other example embodiments, the intensity values of two or more colors may be corrected simultaneously by differing amounts. In other example embodiments, the correction may be implemented not by stretching the range of intensity values, but rather, by simply subtracting the intensity value such as to change the intensity range from [black_point_color, 1.0] to [0.0, (1.0-black_point_color)].

CONCLUSION

The summary and abstract sections may set forth one or more, but not all exemplary embodiments of the present invention as contemplated by the inventors and thus are not intended to limit the present invention in the appended claims in any way.

Various embodiments have been described above with the aid of functional building blocks illustrating the implementation of specific functions and relationships thereof. The boundaries of these functional building blocks have been arbitrarily defined herein for the convenience of the description. Alternate boundaries can be defined so long as it specific functions in relationships thereof are appropriately performed.

The foregoing description of these specific embodiments will so fully reveal the general nature of the invention that others can by applying knowledge within the skill of the art, readily modify and/or adapt for various applications such as specific embodiments without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology and phraseology of the present specification is to be interpreted by the skilled artisan in light of the teachings and guidance.

The breath and scope of the present invention should not be limited to any of the above described exemplary embodiments.

What is claimed is:

1. A computer-implemented method for correcting aberrations in a digital image, comprising:
    partitioning, using one or more processors, a digital image into a rectangular grid of non-overlapping, contiguous sub-local regions;
    for each sub-local region:
        defining, using the one or more processors, a respective local region for the sub-local region, the local region being a proper superset of the sub-local region;
        determining, using the one or more processors, a local black point for the respective local region, the local black point corresponding to a darkest pixel within the respective local region;
        determining, using the one or more processors, a nearest local black point to the sub-local region;
        assigning, using the one or more processors, to each pixel in the sub-local region the determined nearest local black point; and
        correcting, using the one or more processors, a brightness of each pixel in the sub-local region based on the assigned nearest local black point.

2. The method of claim 1, wherein determining a local black point for the respective local region further comprises:
    comparing, using the one or more processors, the brightness of a plurality of pixels within the respective local region to determine the darkest pixels in the region; and
    defining, using the one or more processors, a local black point for the respective local region, the local black point corresponding to a single darkest pixel or local cluster of the darkest pixels within the respective local region.

3. The method of claim 2, wherein the respective local region is rectangular.

4. The method of claim 3, wherein the respective local region comprises a square consisting of $L^2$ pixels, where L is the number of pixels spanning each edge of the respective local region.

5. The method of claim 4, wherein the sub-local region has two adjacent edges that are aligned with the corresponding two adjacent edges of the image, the sub-local region is a square including $r^2$ pixels, where r is the number pixels spanning each edge of the sub-local region, and the respective local region is a square including $L^2$ pixels, where L is the number of pixels spanning each edge of the given local region and L>r.

6. The method of claim 5, wherein r is 500, and L is 1000.

7. The method of claim 1, wherein the correcting, using the one or more processors, a brightness of each pixel in the given sub-local region further comprises subtracting, for each pixel, an intensity of its assigned nearest local black point from an intensity of the pixel.

8. The method of claim 1, wherein the correcting, using the one or more processors, a brightness of each pixel in the sub-local region further comprises reducing for each pixel, the brightness value of the pixel by an amount such that the darkest pixels are affected the most and the brightest pixels are affected the least such as to transform the range of possible brightness values from between black_point and 1 to the range between 0 and 1, wherein the maximum intensity is 1, the minimum intensity is 0, and "black_point" is the intensity value of the corresponding assigned nearest local black point to the pixel.

9. The method of claim 1, wherein the correcting, using the one or more processors, a brightness of each pixel in the sub-local region further comprises subtracting for each pixel, the separate red, green, and blue brightness values (intensities) of its assigned nearest local black point from the separate red, green, and blue brightness values of the pixel.

10. The method of claim 1, wherein the correcting, using the one or more processors, a brightness of each pixel in the sub-local region further comprises reducing for each pixel, the separate red, green, and blue brightness values of the by amounts such that the darkest pixels are affected the most and the brightest pixels are affected the least such as to transform the range of possible brightness values for each color from between black_point_color and 1 to the range between 0 and 1, wherein the maximum intensity is 1, the minimum intensity is 0, and "black_point_color" is the intensity value of a given color (red, green, blue) of the corresponding assigned nearest local black point to the pixel.

11. The method of claim 1, wherein the respective local black point is defined to be a single pixel or clusters of pixels for which the brightness value (intensity) is in the 0.1th percentile.

12. A system, wherein circuitry is provided for correcting aberrations in a digital image comprising:
   a partition generation module configured to:
      partition a digital image into a rectangular grid of non-overlapping, contiguous sub-local regions; and
      define for each sub-local region a given local region, the given local region being a proper superset of the sub-local region;
   a local black point generation module configured to:
      determine a local black point for each local region, the local black point corresponding to a darkest pixel within the local region; and
   an assignment module configured to:
      determine a nearest local black point to each sub-local region; and
      assign to each pixel within the sub-local region the determined nearest local black point; and
   an image correction module configured to correct a brightness of each of the plurality of pixels in each sub-local region based on the assigned nearest local black point.

13. The system of claim 12, wherein the local black point generator further comprises:
   a comparison module configured to compare the brightness of each pixel in the local region to determine the darkest pixels in the region; and
   a definition module configured to define for each local region one or more local black points, wherein each local black point corresponds to a single darkest pixel or local cluster of the darkest pixels in the given local region.

14. The system of claim 12, wherein the partition generation module is configured to partition the image into local regions having their two adjacent edges aligned with the corresponding two adjacent edges of the image.

15. The system of claim 14, wherein the partition generation module is configured to partition the image into local square regions consisting of $L^2$ pixels, where L is the number of pixels spanning each edge of each local region.

16. The system of claim 15, wherein the partition generation module is configured to:
   to partition the image into a rectangular grid of, non-overlapping, contiguous sub-local regions, wherein each sub-local region has two adjacent edges that are aligned with the corresponding two adjacent edges of the image, and each sub-local region is a square including $r^2$ pixels, where r is the number pixels spanning each edge of each sub-local region, r<L and r and L are predefined values.

17. The system of claim 16, wherein r is 500 and L is 1000.

18. The system of claim 12, wherein the image correction module is configured to subtract for each pixel the brightness value (intensity) of its assigned nearest local black point from the brightness of the pixel.

19. The system of claim 12, wherein the image correction module is configured to reduce, for each pixel, the brightness value of the pixel by an amount such that the darkest pixels are affected the most and the brightest pixels are affected the least such as to transform the range of possible brightness values from between black_point and 1 to the range between 0 and 1, wherein the maximum intensity is 1, the minimum intensity is 0, and "black_point" is the intensity value of the corresponding, assigned nearest local black point to the pixel.

20. The system of claim 12, wherein the image correction module is configured to subtract for each pixel, the separate red, green, and blue brightness values (intensities) of its assigned nearest local black point from the separate red, green, and blue brightness values of the pixel.

21. The system of claim 12, wherein the image correction module is configured to reduce for each pixel, the separate red, green, and blue brightness values of the pixel by amounts such that the darkest pixels are affected the most and the brightest pixels are affected the least such as to transform the range of possible brightness values for each color from between black_point_color and 1 to the range between 0 and 1, wherein the maximum intensity is 1, the minimum intensity is 0, and "black_point_color" is the intensity value of a given color (red, green, blue) of the corresponding, assigned nearest local black point to the pixel.

* * * * *

UNITED STATES PATENT AND TRADEMARK OFFICE
CERTIFICATE OF CORRECTION

PATENT NO. : 8,666,190 B1  
APPLICATION NO. : 13/018986  
DATED : March 4, 2014  
INVENTOR(S) : Marwood et al.

Page 1 of 1

It is certified that error appears in the above-identified patent and that said Letters Patent is hereby corrected as shown below:

Page 2 of the title page, 2nd Column under OTHER PUBLICATIONS, line 13, after "Suppression of local", please delete "have" and insert --haze--

In the Claims

Column 9, line 33, claim 10, after "values of the", please insert the word --pixel--

Signed and Sealed this  
Twenty-fifth Day of November, 2014

Michelle K. Lee  
*Deputy Director of the United States Patent and Trademark Office*